United States Patent [19]
O'Neill et al.

[11] Patent Number: 4,960,080
[45] Date of Patent: Oct. 2, 1990

[54] POLLUTION CONTROL APPARATUS AND METHOD FOR A TURBODIESEL MOTOR-GENERATOR SET

[75] Inventors: Jeff S. O'Neill; H. Edmund Schisler; Isoroku Kubo, all of Columbus, Ind.

[73] Assignee: Cummins Engine Company, Inc., Columbus, Ind.

[21] Appl. No.: 316,765

[22] Filed: Feb. 28, 1989

[51] Int. Cl.$^5$ ............................................. F02B 47/00
[52] U.S. Cl. ................................ 123/254; 123/25 N; 60/605.1
[58] Field of Search ................ 123/25 A, 25 N, 25 L; 60/605

[56] References Cited

U.S. PATENT DOCUMENTS

| | | | |
|---|---|---|---|
| 3,834,359 | 9/1974 | Ando | 123/1 A |
| 4,279,223 | 7/1981 | Csonka et al. | 123/25 N |
| 4,300,483 | 11/1981 | Goodman | 123/25 A |
| 4,311,118 | 1/1982 | Slagle | 123/25 A |
| 4,401,059 | 8/1983 | Goodman et al. | 123/252 |
| 4,424,676 | 1/1984 | Meiners | 60/605 |
| 4,461,245 | 7/1984 | Vinokur | 123/25 A |
| 4,563,982 | 1/1986 | Pischinger | 123/25 A |
| 4,632,067 | 12/1986 | Carlson | 123/25 A |

Primary Examiner—E. Rollins Cross
Attorney, Agent, or Firm—Sixbey, Friedman, Leedom & Ferguson

[57] ABSTRACT

A water injection system reduces nitrous oxide emissions in turbocharged internal combustion engines driving electrical power generators. A current-activated relay located in switchgear associated with the generator becomes energized asserted when the current output of the generator exceeds a value that corresponds to predetermined NOx permissible emissions level. The output of the relay activates a motor starter which controls a rotary vane pump. The pump draws distilled water from a water tank, forcing the water through a particle strainer, an adjustable flow regulator, a solenoid, a flow meter, and backflow check valves, to water injection nozzles located in the combustion airstream immediately after a turbocharger compressor. The nozzles provided include fine-mesh strainers and atomize the water to 100 micron particle sizes, and distribute the water particles in an 85-degree spray cone pattern. The resulting system is both reliable and cost-effective, and is readily adaptable to a variety of engine and generator combinations by modifying the current relay trip point and adjusting the flow regulator.

11 Claims, 3 Drawing Sheets

POLLUTION CONTROL APPARATUS AND METHOD FOR A TURBODIESEL MOTOR-GENERATOR SET

BACKGROUND OF THE INVENTION

This invention relates to improving performance of and controlling oxide of nitrogen (NOx) emissions from a motor-generator set comprising a turbocharged diesel engine used to drive an electrical power generating machine.

Turbocharged internal combustion engines may produce significant quantities of NOx emissions due to high combustion temperatures and incomplete burning of the petroleum-based fuel. These NOx emissions are harmful to the environment and to human health. Many localities have legislated limits on stationary motor-generator set NOx emissions, preventing installation of useful machines.

Engineers have developed a number of systems which inject water or water-containing solutions into the combustion chambers of an engine to reduce NOx emissions and/or improve engine performance. Water injection inhibits formation of high-temperature pollutants such as NOx because the combustion process takes place at lower temperatures and the water also displaces a small amount of the air previously available for formation of NOx. Water injection produces some additional advantages. The fluid absorbs heat within the combustion chamber and provides for an even burning rate to prevent, or at least minimize, detonation of the fuel charge in the combustion chamber. In addition, the fluid diminishes the accumulation of carbon deposits in the combustion chambers.

As an example of a prior-art water injection system, U.S. Pat. No. 4,424,676 to Meiners discloses a system which injects a water-alcohol-air mixture into the engine intake air stream through nozzles at the outlet side of a turbocharger compressor. This system responds to manifold pressure rather than to any direct engine load measurement and is primarily designed to improve engine performance rather than to reduce NOx emissions. U.S. Pat. No. 4,440,116 to Stevenson shows a similar system.

U.S. Pat. Nos. 4,401,059 and 4,300,483 to Goodman et al. shows another water and air injection system responding to pressure in the intake manifold and/or engine speed. This system provides a continuously varying fluid injection rate, and is designed to reduce NOx emissions in a non-turbocharged engine.

U.S. Pat. No. 4,311,118 to Slagle shows a water injection system adaptable to different diesel engines which provides a constant water injection flow rate above certain engine speed, throttle, and oil pressure settings to achieve known benefits. Other water injection systems that are even less similar to the present invention are shown in U.S. Pat. No. 3,834,359 (Ando) and U.S. Pat. No. 4,279,223 (Csonka).

None of these systems are optimal for use in a stationary turbodiesel motor-generator set because pollution control on a stationary turbodiesel motor-generator set presents different problems than pollution control on other diesel engines such as vehicle engines. A generator engine operates at constant speed, and the load varies with the amount of power being generated. Most other diesel engines are operated at speeds and loads which vary depending on many factors. The systems described above for water injection were generally designed for vehicle engine systems, and some include means for dynamically varying the rate of water injection. These systems are more expensive than necessary and in fact do not produce optimal results in turbodiesel power generation systems. In particular, these variable flow systems may at some times inject more water than necessary into the intake air stream, resulting in poor engine operation, poor fuel economy, and waste of expensive distilled water, or these systems may not activate at the proper time to maintain NOx emissions within required levels.

Further, the systems known in the art require complex, costly, and relatively unreliable sensors such as pressure sensors. Some systems actually use several sensors of different types, multiplying the number of potential breakdown points. Diesel motor-generator sets are normally used in continuous operation, and it is undesirable to shut the engine down to service the water injection system.

There is a need for a simple, inexpensive, and reliable system which will allow turbodiesel power generation units to meet applicable emissions requirements.

SUMMARY OF THE INVENTION

It is known that NOx emissions increase with increased engine loads. The inventors have discovered that the engine load in a motor-generator set can be measured most cheaply and effectively by measuring the power output of the attached generator. After determining the power output beyond which emissions exceed allowable levels, it is thus possible to provide an inexpensive system which injects water into the combustion chambers at a constant rate above a specified engine load. Further, this system can be easily adapted to a variety of engine-generator combinations, it being necessary only to adjust the activation set point and water flow rate to meet the requirements of each engine-generator combination.

Therefore, it is a general object of this invention to provide a novel method and system for controlling NOx emissions in a turbocharged diesel-fueled motor-generator set, which will reduce engine emissions, improve engine performance, and increase the lief of the engine, in addition to providing other advantages.

More specifically, it is an object of the present invention to provide a novel and unique fluid injection system and method by which fluid is injected at a continuous measured rate into an engine intake air stream, wherein the system is activated when the power output of the generator driven by the engine exceeds a specified level.

It is another object of the present invention to provide a novel and unique engine intake air stream fluid injection system for motor-generator sets which is activated by a current-responsive relay in the generator switchgear when the generator load exceeds a specified value.

A further object of the present invention is to provide a novel and unique engine intake air stream fluid injection system for motor-generator sets which is readily adapted to control engine emissions of a variety of motor-generator combinations.

The present invention achieves these and other objects by providing a system for regulating the emissions output of a diesel engine having a turbocharger compressor and driving an electrical generator having controlling switchgear. A current-activated relay located in the generator switchgear becomes activated when the current output of the generator exceeds a predetermined value that corresponds to a permissible emissions level. The output of the relay activates a motor starter which controls a rotary vane pump. The pump draws distilled water from a water tank, forcing the water through a particle strainer, an adjustable flow regulator, a solenoid, a flow meter, and backflow check valves, to water injection nozzles located in the combustion airstream immediately after the turbocharger compressor. The nozzles provided include fine-mesh strainers and atomize the water to 100 micron particle sizes, and distribute the water particles in an 85-degree spray cone pattern.

The resulting system is both reliable and cost-effective, and is readily adaptable to a variety of engine and generator combinations by modifying the current relay trip point and adjusting the flow regulator.

DETAILED DESCRIPTION OF THE PREFERRED EMBODIMENT

The method and the system which effectively employs the method of the present invention may be applied generally to electrical power generation sets comprising an internal combustion engine and an electrical power generator. These devices are commonly known as motor-generator sets, gensets, or generator sets, and may form part of a cogeneration installation. For example, the system and method described herein may be applied to a motor-generator set such as a Cummins KTTA50 GCl stationary power generation unit which includes a sixteen-cylinder turbocharged diesel-fueled engine and a 950-kilowatt generator.

The system includes both fluid flow control elements and electrical controls; the construction and operation of the fluid flow control elements will be described first with particular reference to FIG. 1 and a motor-generator set of the type mentioned in the preceding paragraph. In general, the fluid flow control elements are connected using hollow pipes to form a dedicated system which takes fluid from a water tank 2 and pumps the fluid toward with a V-type engine, for example, a left bank injection nozzle 60 and a right bank injection nozzle 62, where the fluid leaves the system. In describing the system, reference will be made to forward and reverse flow as well as to upstream and downstream directions. It will be understood that forward flow refers to the normal fluid flow in the system from water tank 2 toward nozzles 60 and 62, and that the nozzles 60 and 62 are downstream from the water tank 2. Reverse flow will be used to describe any flow in the direction from the nozzles 60 and 62 toward the water tank 2, the water tank 2 being upstream from the nozzles 60 and 62. Finally, while the system will be described in term s of water injection, any other suitable fluid such as a water-alcohol or water-ammonia solution could be used.

Figure 1:
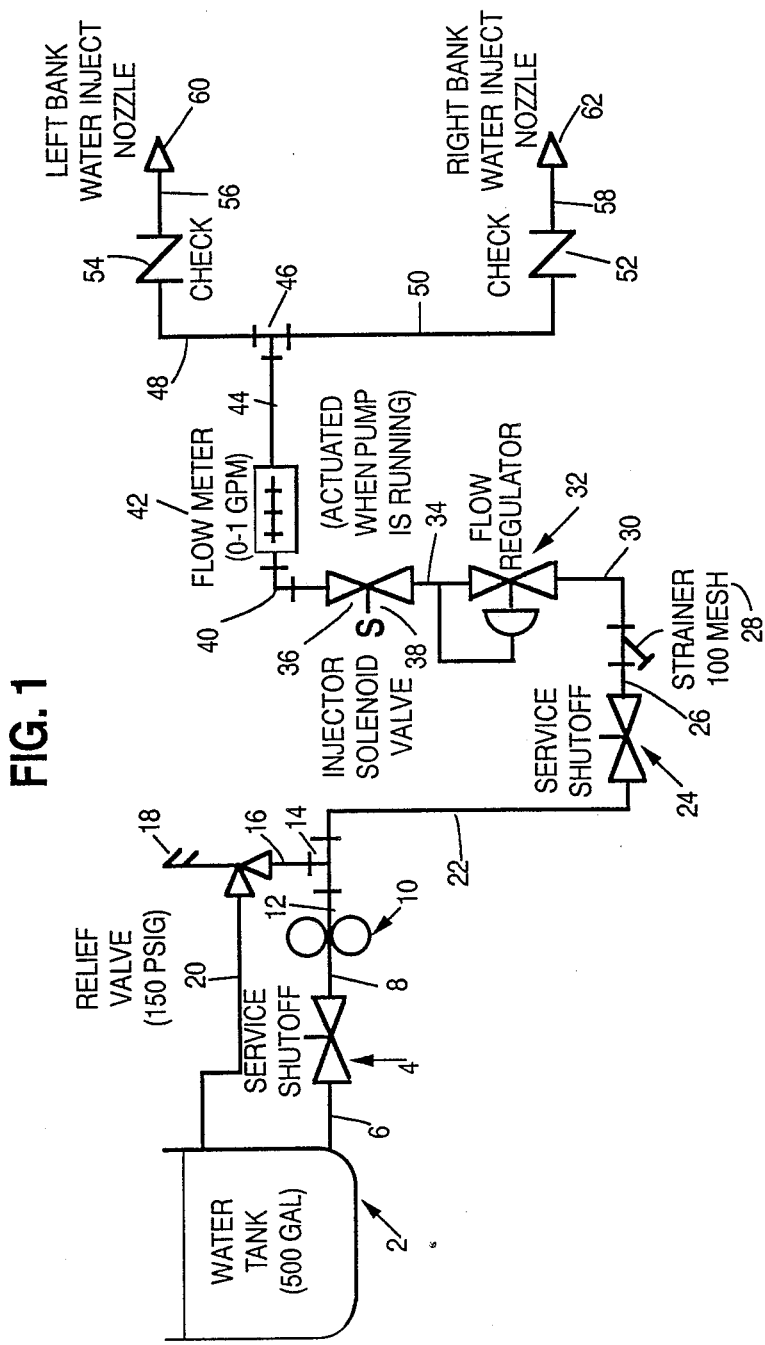
FIG. 1 is a schematic representation of the fluid flow control elements of a preferred embodiment of the present invention.

Referring now to FIG. 1, the water tank 2 holds, for example, 500 gallons of water. This water is preferably distilled or deionized so as to prevent introduction of foreign material which may lead to corrosion or formation of deposits in the engine. The water tank 2 is connected by a pipe 6 to a conventional service shutoff valve 4 which may be opened and closed to respectively allow or prevent flow of water from the water tank 2 through pipe 6. The service shutoff valve 4 will ordinarily be left in the open position, but is provided so that the fluid transfer connection between water tank 2 and other portions of the system can be closed if it becomes necessary to remove and replace a system element. The service shutoff valve 4 is connected by a pipe 8 to the intake of a rotary vane pump 10. The rotary vane pump 10 may be of any appropriate design, but is preferably an electrically-operated positive-displacement type pump. For the Cummins KTTA50 engine, one appropriate pump is a Procon 2603, which is a one-half horsepower, 230 volt alternating current, 4.9 Ampere pump. The pump is preferably an on-off type that either operates to produce full rated pressure or is turned off, depending on the presence or absence of power from the control circuit, which will be described later in greater detail.

The output of rotary vane pump 10 is connected to a pipe 12, which is connected by a T-fitting 14 to pipes 16 and 22. The pipe 16 is connected to a relief valve 18 having an outlet pipe 20 which drains into water tank 2. The relief valve 18 is preferably set to open when the pressure in pipe 16 exceeds 150 pounds per square inch (psi). Because the pump 10 is capable of producing pressures greater than 300 psi, the relief valve must provide a continuous bypass when the pump is running to maintain system pressure at 150 psi. Pressurized fluids released from the system through the relief valve will flow through the open relief valve 18 and through outlet pipe 20, thus draining back into water tank 2. One appropriate relief valve is a model 6815-½-AL-300 sold by Spraying Systems Co.

Those skilled in the art will appreciate that the pump 10 and relief valve 18 described work together to produce the optimum and desired system pressure of 150 psi. Because of the need for reliability in generator set applications, an industrial-grade pump must be used. In addition, the fluid injection system of the present invention w ill not produce smooth water injection spray unless system pressure is rigidly controlled. The combination of a large-capacity pump 10 and relief valve 18 provides reliability and system water pressure control which are superior to the reliability and pressure control of a lower-capacity pump operating alone.

The pipe 22 is connected to a conventional service shutoff valve 24, which is normally open but may be closed during servicing of the system to eliminate the fluid transfer connection between the elements upstream of service shutoff valve 24 (including rotary vane pump 10 and water tank 2) and the elements downstream of service shutoff valve 24. When closed at the same time, the service shutoff valves 4 and 24 cooperate to remove the rotary vane pump 10 and relief valve 18 from fluid transfer connection with the other elements of the system, so that the pump 10 or valve 18 can be removed and replaced.

The service shutoff valve 24 is connected to a pipe 26 which is connected to a conventional strainer 28. The strainer 28 is designed to catch any particulate matter trapped in the fluid, and preferably contains a 100-mesh filter element.

The downstream side of strainer 28 is connected to one end of a pipe 30 which connects at its other end to the upstream side of a conventional flow regulator 32. The flow regulator 32 should be readily adjustable to allow various uniform downstream fluid flow rates between zero and one gallon per minute. The flow regulator will be set for a particular fluid flow rate. The fluid flow rate is chosen for the particular engine-generator combination in use so as to inject at least the amount of water required to maintain engine NOx emissions within regulatory guidelines at full generator load. The fluid flow rate is also chosen to be low enough so that the injected water spray will vaporize in the engine air intake stream prior to induction into the combustion chamber. For the Cummins engine-generator combination described previously, the water injection system m ay be set to inject approximately one half gallon of water per minute at generator loads greater than 800 kilowatts.

The downstream side of flow regulator 32 is connected to one end of a pipe 34, the other end of the pipe 34 being connected to the upstream side of injector solenoid valve 38. The injector solenoid valve 38 is preferably electrically operated and is connected to circuitry which opens the valve 38 when the rotary vane pump 10 is running. This circuitry will be described later in more detail. The circuitry closes injector solenoid valve 38 when the pump 10 is not running. The closed valve 38 keeps the pressure generated by the depth of water in water tank 2 from producing a downstream flow in the system when the pump 10 is not functioning.

The downstream side of the injector solenoid valve 38 is connected to one end of a pipe 40. The other end of the pipe 40 is connected to the upstream side of a flow meter 42. The flow meter 42 should be capable of displaying flow rates between zero and one gallon per minute. The flow meter allows maintenance personnel to verify that the flow regulator 32 is set to produce the proper flow rate to control emissions of the engine-generator combination as previously described. If flow regulator 32 needs to be adjusted, the adjustments can be made with reference to the flow meter 42. The inclusion of adjustable flow regulator 32 and flow meter 42 in the present system provides particular advantages. The flow adjustments enable fine-tuning of water injection system performance on a particular engine, including adjustments to meet changing emissions regulations. The flow adjustment capability also allows the same water injection system components to be used on a wide variety of engine-generator combinations. Thus, economies of scale can be realized in manufacture of the system, and new water injection systems need not be designed for new engine-generator combinations or engine-generator combinations existing in the field.

The downstream side of flow meter 42 is connected to pipe 44, which is connected by a T-fitting 46 to pipes 48 and 50, which are connected to the upstream sides of check valve 54 and check valve 52, respectively. Check valves 54 and 52 are connected to pipes 56 and 58, respectively, which are connected at their other ends to the left bank water injection nozzle 60 and the right bank water injection nozzle 62 respectively.

The check valves 54 and 52 allow downstream flow during operation of the pump 10 but close when pressure is greater downstream than upstream to prevent upstream fluid flow, including flow of water or air. Thus, when the rotary vane pump 10 is not operating, fluids will not be driven through the system in reverse by pressure in the engine intake stream impinging on the nozzles 60 and 62. In addition, because the check valves 54 and 52 are spring-biased to close when downstream pressure is minimal, they will restrict downstream flow when the pump 10 is not operating. Thus, the check valves work in a manner similar to injector solenoid valve 36 in that they prevent water flow through the injection nozzles 60 and 62 when the pump is not operating. The location of the check valves in close proximity to the nozzles 60 and 62 ensures a sharp cutoff of the water flow through the nozzles 60 and 62 when the fluid injection system is deactivated. Relatively unpressurized water will not drain through the nozzles 60 and 62 into the combustion air stream when pump 10 is not operating. This check valve operation also prevents hydraulic locking of the engine during shutdown of the system.

In the Cummins KTTA50 engine, four turbocharging units are provided, comprising a high-pressure and a low-pressure stage on each of the left and right sides of the V-16 engine. Thus, there are two engine air intake streams. The water injection nozzles 60 and 62 are, preferably, mounted within a respective one of these two engine air intake streams, downstream from the high-pressure and low-pressure turbocharging compressors and upstream from the combustion chambers of the engine. Upon introduction to the combustion air stream, the liquid water sprayed from the nozzles 60 and 62 vaporizes, replacing some of the air in the air stream and cooling the air stream. A particular advantage of the present system lies in the placement of the nozzles downstream from the turbo compressors so that the nozzles spray into intake air which is highly compressed and thus heated. This compressed intake air is capable of absorbing more water vapor than intake air upstream from a turbocharging compressor or intake air in a non-turbocharged engine. The placement of the nozzles downstream from the turbocharging compressors is highly desirable to achieve the required NOx emissions reduction efficiently in the application described.

The nozzles 60 and 62 are conventional and preferably include fine-mesh backup strainers to catch any solid particles that were not caught by strainer 28 to prevent injection of these particles into the engine intake air stream. The nozzles preferably discharge water particles in an 85-degree spray cone pattern with approximately 100-micron water particle size so that the water particles are widely dispersed in the intake air stream. One suitable nozzle is a Spraying Systems model number ¼-LNND-SS14. The rotary vane pump 10 and relief valve 18 are chosen in conjunction with the nozzles 60 and 62 so that the system pressure produced by the combination of pump 10 and relief valve 18 works with the configuration and size of nozzles 60 and 62 to produce the desired 100-micron water particle size.

Figure 2:
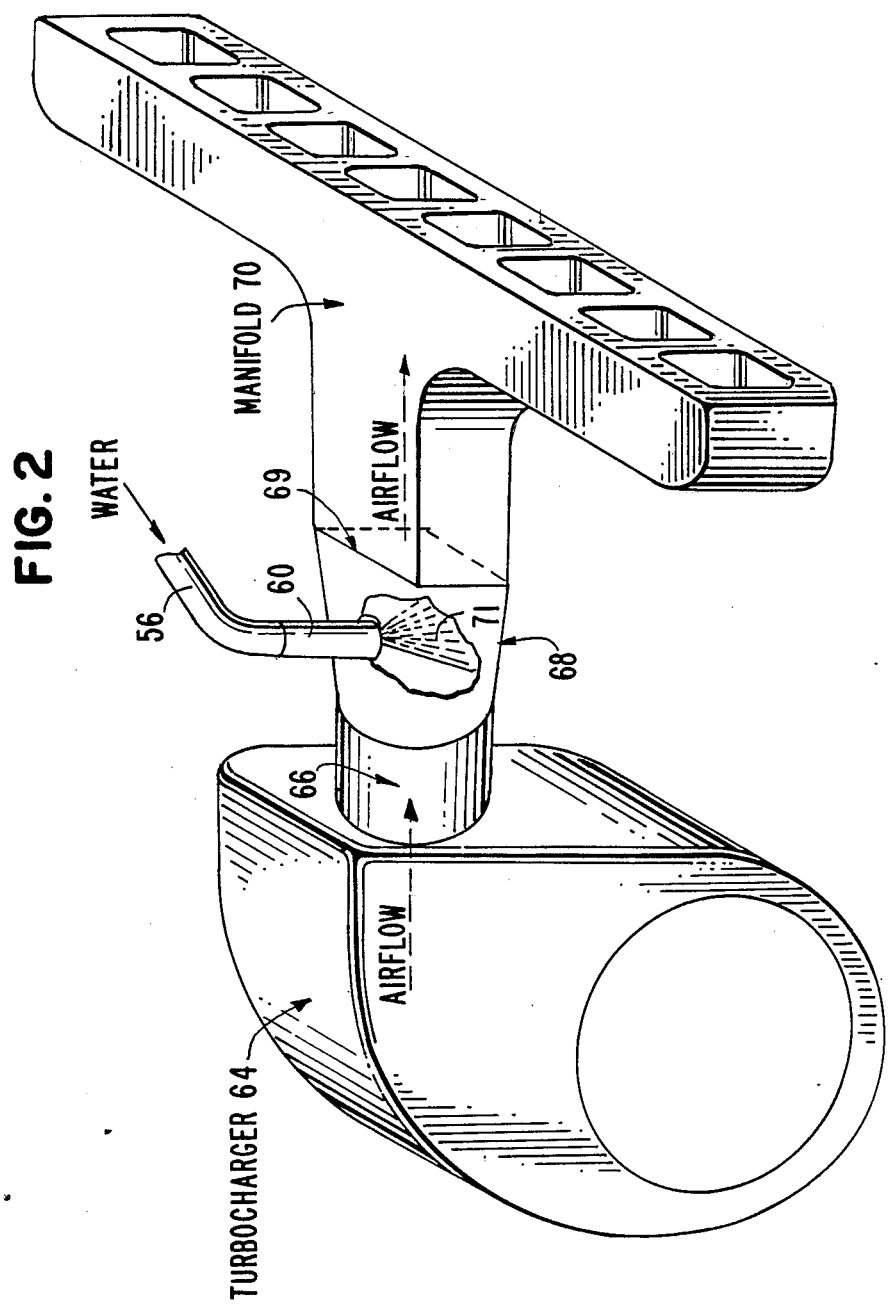
FIG. 2 is a perspective view of the engine airflow intake elements of an engine showing the mounting of the fluid spray nozzles.

FIG. 2 shows the mounting of the left bank injector nozzle 60. A turbocharger 64 has a circular airstream outlet 66 which is mounted to one end of a connector 68. The other end of connector 68 is mounted to a rectangular manifold port 69 of a manifold 70. The connector 68 thus forms a transition adapting the circular airstream outlet 66 to the rectangular manifold port 69 and permitting engine intake air to flow smoothly from the turbocharger 64 to the left engine intake manifold 70 as shown by the arrows in the illustration. The left bank injection nozzle 60 is mounted on the connector 68 at a right angle to the airflow through connector 68, so that the spray cone water output 71 of nozzle 60 is carried away and vaporized by the airflow through connector 68 and into manifold 70. The devices and connections on the left side of the engine, as shown in FIG. 2, are duplicated on the right side of the engine.

Of course, any number of injection nozzles could be used within the scope of the invention depending on the configuration of the engine used. For example, a single injection nozzle could be provided for an inline cylinder engine, or individual injection nozzles could be provided for each cylinder.

With the on-off pump control described briefly above and the flow regulator 32, the pump 10 can be activated to produce water injection into the engine air intake stream at the specified rate as displayed on flow meter 42. When the pump 10 is deactivated, no water injection will occur. While the system described can produce only these two alternate results, the system is particularly reliable because it contains few moving or complex parts. The parts used also require little regular maintenance. The system is much less expensive than systems which provide continuously varying injection rates, and is, therefore, more desirable for power generation applications since the engines involved operate at a constant speed and the generators are usually operated within a narrow load range. Thus, despite its simplicity, this fluid flow control system produces accurate and inexpensive water injection rate control suitable for generator sets.

The method and means for controlling activation of the fluid flow control system just described will now be explained. It has been found that the NOx emissions of a turbocharged diesel engine increase with increased engine load. The engine load of an engine driving an electrical power generator varies directly with the electrical load on the generator.

Thus, to maintain NOx emissions within required levels, the fluid flow control devices are activated when the generator power output exceeds a specified activation power level. This activation power level is determined experimentally for each motor-generator set by finding the power output level in kilowatts above which the engine violates NOx emissions requirements. Then, using well-known equations which vary depending on the generator switchgear configuration, this activation power level may be correlated with a specific current output level of a switchgear transformer. This current output level is the setpoint for a current-sensitive relay in the generator switchgear. This current-sensitive relay activates the fluid flow control elements when transformer current output exceeds the generator current threshold, i.e. when generator power output exceeds the activation power level. While the preferred embodiment measures output current to determine output power, other electrical measurements, such as wattage or voltage, could be used as long as these measurements reflect increased engine load in the specific application.

Figure 3:
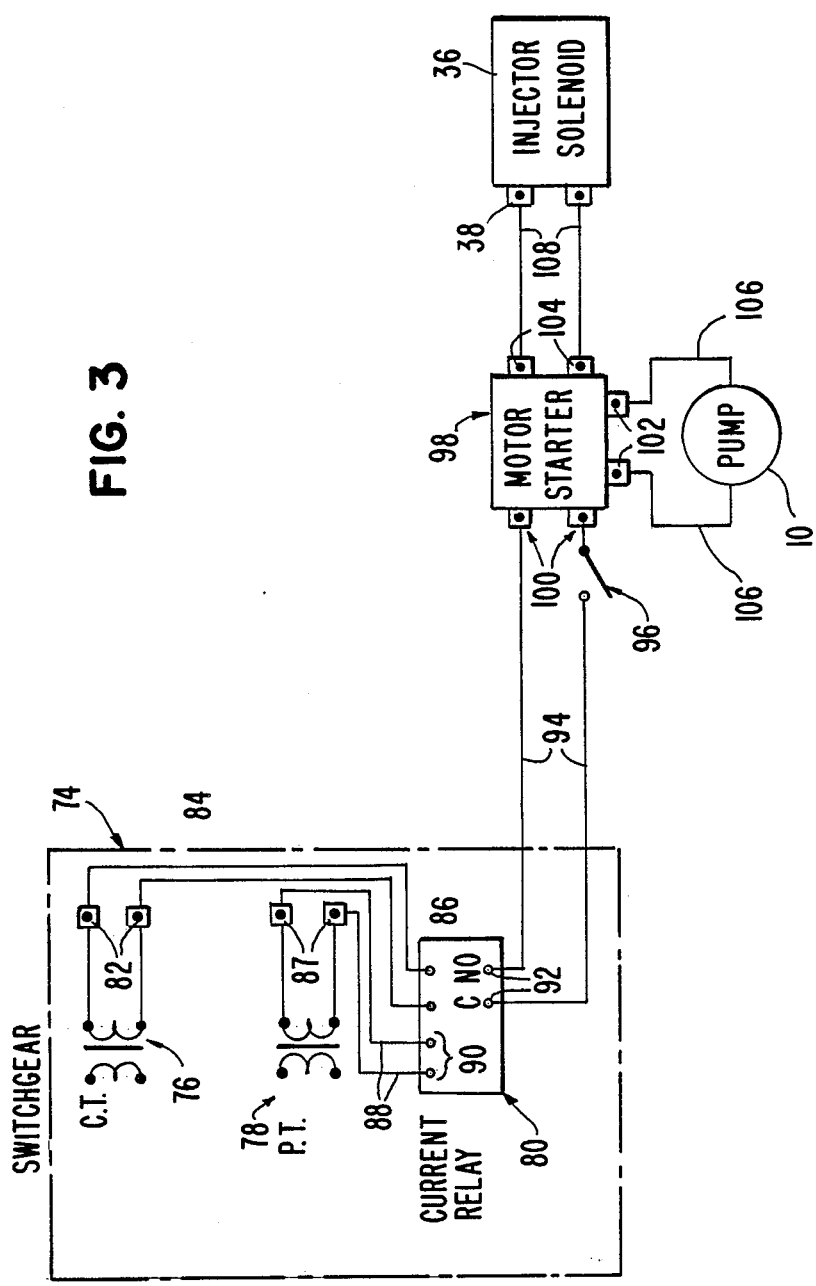
FIG. 3 is a schematic diagram of the electrical control components of a preferred embodiment of the present invention.

The electrical controls which produce these results will now be described in detail with particular reference to FIG. 3. In FIG. 3, a portion of the center section of the diesel generator set switchgear is shown generally at 74. The switchgear portion 74 comprises a current transformer 76, a power transformer 78, and a current relay 80 with associated wires and terminals. Current relay 80 is equipped with sensing terminals 86, power terminals 90, and output terminals 92. In FIG. 3, a motor starter 98 has switch terminals 100, output terminals 102, and auxiliary output terminals 104. The output terminals 92 are connected to the switch terminals 100 of motor starter 98 by activating wires 94 which contain disconnect switch 96. The motor starter output terminals 102 are connected by wires 106 to the motor of the rotary vane pump 10. The motor starter auxiliary output terminals 104 are connected by power wires 108 to the solenoid electrical activator connection 38 of injector solenoid valve 36.

The windings of the current transformer 76 sense current in one phase of the power generator output. The secondary winding of current transformer 76 is connected to terminals 82. Current sensing lines 84 are connected between terminals 82 and current relay sensing terminals 86.

The current transformer 76 used to provide current relay sensing signals is preferably the current transformer already provided in the switchgear 74 for driving power level indicating devices. In the Cummins KTTA50 GSl generator set, this current transformer 76 has a primary-to-secondary turns ratio of 4000:5, so that the transformer 76 steps current down by a factor of 800.

The primary windings of power transformer 78 are connected to an available source of single phase alternating current, such as one phase of the generator output. The secondary windings of power transformer 78 are connected to terminals 87. The power transformer 78 is selected to produce operating power for the current relay 80 at the voltage required by relay 80. In the preferred embodiment, the primary-to-secondary turns ratio of power transformer 78 is 480:120 so that when the primary windings of pow transformer 78 are connected to a 480 volt source, 120 VAC power will be available at terminals 87. Terminals 87 are connected by power lines 88 to the current relay power contacts 90.

The current relay 80 is of conventional design. This relay responds to current flowing at sensing terminals 86, energizing the output terminals 92 whenever the current at sensing terminals 86 exceeds an adjustable setpoint. The current relay 80 is selected and set so that the output terminals 92 of relay 80 will be energized whenever the generator exceeds a specified power output, and will not be energized below the specified power output level.

The setpoint of the current relay 80 is chosen in the following manner. If the water injection system is to be energized at a generator three phase output power P of 800 kilowatts (the activation setpoint), and the generator produces an output voltage V of 480 VAC, the internal relay contacts should close when the output current I of the generator is 962 amperes, this value being calculated using the formula $P = V \times I \times \sqrt{3}$. Since generator output current is reduced by a factor of 800 at current relay sensing terminals 86 because of the action of current transformer 76, the current relay 80 should be adjusted to energize output terminals 92 when a current of $962/800 = 1.2$ amperes appears on sensing terminals 86.

The current transformer 76 and current relay 80 must be selected and adjusted in tandem so that output terminals 92 are energized above the specified generator power output level. It will be appreciated that different setpoints for current relay 80 and different turns ratios for current transformer 76 could be used, as long as the new values selected provide proper energizing of current relay output terminals 92 according to the formulae above.

When the load on the power generator exceeds the specified value, so that water injection must be provided to reduce NOx emissions, the current relay 80 will energize the output terminals 92. Provided that the disconnect switch 96 is in its normal closed position, the motor starter 98 will be activated by the signal from output terminals 92 passing through wires 94. The motor starter 98 will then provide 240 VAC power to output terminals 102 and auxiliary output terminals 104. The motor starter 98 obtains this 240 VAC power from a 240 VAC power source which is wired in a conventional manner through a fused disconnect switch to the motor starter 98. Preferably, this 240 VAC power source is available only when the engine of the generator set is running. For clarity, the 240 VAC power source and the power source connection to the motor starter are not shown in the drawing figure.

When the motor starter 98 energizes output terminals 102, operating power is applied to the rotary vane pump 10, so that water is pumped through the water injection system (shown in FIG. 1). At the same time, auxiliary output terminals 104 are energized to provide power to injector solenoid valve 36, opening injector solenoid valve 36 to permit pumping of fluid to the nozzles 60 and 62 as was described previously with reference to FIG. 1.

Thus, the present invention provides a method for economically and effectively controlling motor-generator set emissions, and further provides a system which implements the method disclosed.

We claim:

1. An emissions control system for an internal combustion engine drivingly connected to an electrical power generator having an electrical power output, said emissions control system having fluid injecting means for injecting fluids into a combustion intake air stream of said engine, having power measurement means for producing a signal in response to the electrical power output of the generator, and having control means for controlling said fluid injecting means in response to a signal produced by the power measurement means.

2. The system of claim 1 wherein the fluid is water.

3. The system of claim 1 wherein the engine is equipped with compression means for pressurizing the combustion intake air stream, and where the fluid injecting means injects fluid into the combustion intake air stream downstream from the compression means.

4. The system of claim 3 wherein the engine is a compression ignition engine.

5. The system of claim 1 wherein the fluid injecting means comprises a storage means for storing fluids, an impelling means for transferring said fluids, a flow regulation means for regulating the output flow rate of the impelling means, and a discharge means for discharging said fluids into the combustion intake air stream.

6. The system of claim 5 wherein the fluid injecting means further includes check valve means proximate to the discharge means for preventing fluid flow through the discharge means when the fluid injecting means are not activated.

7. The system of claim 5 wherein the fluid injecting means further includes pressure relief means which cooperates with the impelling means to produce a constant fluid pressure to the discharge means.

8. The system of claim 7 wherein the pressure relief means provides a continuous fluid bypass during the operation of the impelling means, said bypassing fluid discharging into the storage means.

9. The system of claim 5 wherein the fluid injecting means further includes a forward flow cutoff means for preventing fluid flow from the impelling means when the impelling means is not activated.

10. The system of claim 1 wherein the control means comprise a circuit which activates the fluid injecting means in response to generator current output above a specified level and deactivates the fluid injecting means when generator current output is below the specified level.

11. A method of controlling emissions of an internal combustion engine which is connected to and drives an electrical power generator producing an output current, said method comprising the steps of:
 (a) determining the largest electrical power generator output current that can be produced without emissions of the internal combustion engine exceeding a specified level;
 (b) selecting an emissions control activation current which is less than the largest electrical power generator output current that can be produced without emissions of the internal combustion engine exceeding a specified level;
 (c) continuously measuring the output current of the electrical power generator;
 (d) continuously comparing the output current of the electrical power generator to the activation current;
 (e) automatically injecting fluid vapor into the combustion chambers of the internal combustion engine whenever the output current of the electrical power generator exceeds the activation current.

* * * * *